United States Patent
Boer et al.

(10) Patent No.: US 11,412,750 B2
(45) Date of Patent: Aug. 16, 2022

(54) EDIBLE DISPERSIONS COMPRISING OIL AND STRUCTURING AGENT

(75) Inventors: Brigitta Boer, Vlaardingen (NL); Eckhard Floter, Vlaardingen (NL); Gijsbert Michiel Peter Van Kempen, Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 696 days.

(21) Appl. No.: 11/883,220

(22) PCT Filed: Jan. 9, 2006

(86) PCT No.: PCT/EP2006/000116
§ 371 (c)(1),
(2), (4) Date: Jul. 27, 2007

(87) PCT Pub. No.: WO2006/079445
PCT Pub. Date: Aug. 3, 2006

(65) Prior Publication Data
US 2008/0118624 A1    May 22, 2008

(30) Foreign Application Priority Data
Jan. 28, 2005  (EP) .................................. 05075222

(51) Int. Cl.
A23D 7/00    (2006.01)
A23D 7/02    (2006.01)

(52) U.S. Cl.
CPC ............. *A23D 7/003* (2013.01); *A23D 7/001* (2013.01); *A23D 7/02* (2013.01)

(58) Field of Classification Search
CPC ........... A23D 7/001; A23D 7/003; A23D 7/02
USPC ........................................ 426/602, 606, 607
See application file for complete search history.

(56) References Cited

U.S. PATENT DOCUMENTS

| | | | |
|---|---|---|---|
| 4,791,000 A * | 12/1988 | Holemans et al. ........... 426/606 |
| 4,889,740 A | 12/1989 | Price | |
| 5,858,445 A | 1/1999 | Huizinga et al. | |
| 5,874,599 A | 2/1999 | Harris et al. | |
| 6,277,433 B1 * | 8/2001 | Lantz et al. .................. 426/606 |
| 6,395,324 B1 * | 5/2002 | Effey et al. .................. 426/606 |
| 6,517,884 B1 * | 2/2003 | Bauer-Plank et al. ........ 426/604 |
| 8,833,688 B2 | 9/2014 | Koop et al. | |
| 2004/0071857 A1 * | 4/2004 | Besselink et al. ............ 426/607 |

FOREIGN PATENT DOCUMENTS

| | | |
|---|---|---|
| EP | 0775444 | 5/1997 |
| WO | WO 98/47386 | 10/1998 |
| WO | WO 01/05241 | 1/2001 |
| WO | WO0105241 A | 1/2001 |
| WO | WO0135756 | 5/2001 |
| WO | WO 03/084337 | 10/2003 |
| WO | WO 03084337 | * 10/2003 |
| WO | WO2005014152 | 2/2005 |
| WO | WO2005014158 | 2/2005 |
| WO | WO2006079445 | 8/2006 |

OTHER PUBLICATIONS

"The Lipid Handbook" 3rd edition, eds. F. Gunstone, J. harwood, A. Dikjstra, CRC press, 2007, Chapter 4.3., p. 285 ff. (Year: 2007).*
International Search Report International Application No. PCT/EP2006/000116 dated Mar. 28, 2006.
European Search Report EP 05075222 dated Jun. 24, 2005.
Gunstone et al., "The Lipid Handbook", $2^{nd}$ Edition, Chapman and Hall, p. 405.
Peck, Hong Yap et al., "Polymorphism of Palm Oil and Palm Oil Products", Journal of the American Oil Chemists' Society, Champaign, IL, vol. 66, No. 5, May 1989, pp. 693-697, XP000327264.
IPRP in PCTEP2006000116, Mar. 9, 2007.
IPRP2 in PCTEP2004006544, Jan. 3, 2006, WO.
Search Report in EP10186419, dated Nov. 18, 2010.
Search Report in PCTEP2004006544, dated Jan. 28, 2005, WO.
Written Opinion in EP05075222, dated Jun. 24, 2005.
Written Opinion in EP10186419, dated Nov. 18, 2010.
Written Opinion in PCTEP2004006544, dated Jan. 28, 2005, WO.

* cited by examiner

*Primary Examiner* — Erik Kashnikow
*Assistant Examiner* — Assaf Zilbering
(74) *Attorney, Agent, or Firm* — Arentfox Schiff LLP

(57) ABSTRACT

The invention relates to an edible dispersion having a Bostwick value of at least 4 at 15° C., wherein: 1 wt. %<H3<6 wt. %; 1 wt. %<H2U<20 wt. %; and wherein at least 30 wt. % of the H3 triglycerides consist of monoacid triglycerides; H representing long-chain saturated fatty acids containing at least 16 carbon atoms and U representing cis-unsaturated fatty acids.

15 Claims, No Drawings

EDIBLE DISPERSIONS COMPRISING OIL AND STRUCTURING AGENT

TECHNICAL FIELD

The present invention relates to edible dispersions comprising oil and structuring agent, in particular to such dispersions comprising oil and structuring agent as continuous phase and a dispersed phase. The dispersed phase may be an aqueous liquid (thus forming a water-in-oil emulsion) and/or a solid particulate matter (thus forming a suspension) or a combination thereof.

BACKGROUND TO THE INVENTION

Edible dispersions comprising oil and structuring agent are well known. Examples of well-known products that substantially consist of such edible dispersions are water-in-oil emulsions, such as for instance margarines and spreads. These edible dispersions typically have an oil phase that is a blend of liquid oil and fat that is solid at normal ambient temperature (20° C.). This solid fat, often also designated as hardstock, acts as structuring agent, and its function is to stabilise the dispersion. For a margarine or spread, ideally the structuring Agent has such properties that it should have melted or dissolved at mouth temperature, otherwise the product has a heavy, waxy mouthfeel. Other known dispersions comprising oil and structuring agent are disclosed in EP-A-775444 and WO 98/47386. Herein the dispersed phase is a dry particulate matter, such as e.g. flour, starch, salt, spices, herbs etc.

Pourable or squeezable food products having a water phase and a fat phase are for example known as liquid frying products which are pourable or squeezable water in oil emulsions at ambient temperature. These products are for example used in shallow frying. Pourable and squeezable products are considered to be more easily dosed than plastic products for example packed in a wrapper or a tub, and are therefore desired frying products. The pourability or squeezability of these products is evidenced by a Bostwick value of at least 4 at 15° C. For pourable products, a Bostwick value of at least 7 is preferred. The method to determine this value is illustrated in the examples.

The physical storage stability of pourable or squeezable products is considered an important characteristic. For example squeezable or pourable emulsions may show formation of an oil layer on top of the emulsion after storage at temperatures between 5 and 25° C. The formation of such an oil layer is referred to as oil separation. Pourable products such as liquid frying products preferably show oil separation of less than 7 vol %, more preferred less than 5 vol %, on total product after storage at 15° C. for 4 weeks.

WO01/35756 describes a pourable or squeezable food product suitable for use in shallow frying, the described products have a Bostwick value of at least 7. The hardstock used in the product described in the examples of WO01/35756 is RPhe70, which is high erucic rapeseed oil hydrogenated (or hardened) to a slip melting point of 70° C. RPhe70 is unrivalled as hardstock fat not only in liquid margarine, but also in other pourable fatty dispersions consisting of a triglyceride oil in which a non-fat phase is dispersed. WO 98/47386, for example, deals with the stabilisation of a pourable dispersion, which contains herbs dispersed in an oil structured with a hardstock fat.

Although RPhe70 is considered a high quality liquid margarine hardstock fat, its use also has less favourable aspects. RPhe70 is derived from natural rapeseed oil which has a high erucic acid content. From a nutritional point of view erucic acid containing raw materials should be avoided in the preparation of food compositions. Besides this aspect and its high price, RPhe70 has the further major drawback that it is obtained by hydrogenation, a chemical treatment which does not fit in the present trend to avoid in food manufacture chemically processed and particularly hydrogenated ingredients.

WO 01/05241 describes pourable fatty dispersions containing: a hardstock fat consisting of a mixture of triglycerides, characterised in that it contains at least 5 wt. % of a first triglyceride having a melting point >55° C.; at least 5 wt. % of a second triglyceride having a melting point >55° C.; at least 15 wt. % of triglycerides with a difference in chain length of the longest and shortest residue of at least four carbon atoms; not more than 25 wt. % of triglycerides having a melting point of 25-55° C. and with the proviso that the hardstock is not fully hardened high erucic rapeseed oil. In table I, as a comparative example, a liquid margarine is described that contains 2 wt. % of dry fractionated palm oil stearin with a slip melting point of 52 and 98 wt.% sunflower. This product was found to exhibit poor stability as it suffers from oil exudation. The concentration of trisaturated triglycerides in this product is well below 1 wt. %.

SUMMARY OF THE INVENTION

It is therefore an object of the invention to provide an edible dispersion having a Bostwick value of at least 4 at 15° C. and that has good stability This object is attained according to the invention in that Edible dispersion having a Bostwick value of at least 4 at 15° C., having as characteristics that a) the ratio H3/H2U>0.50; b) 0.5 wt. %<H3<10 wt. %; c) 0 wt. %<H2U<20 wt. %; and d) the H3 triglycerides consist for 10 wt. % or more of monoacid triglycerides.

DETAILED DESCRIPTION OF THE INVENTION

A dispersion is herein defined as a system in which two or more phases that are insoluble or only slightly soluble are distributed in one another.

The dispersion may be an emulsion, a suspension or foam or any combination thereof, it may be oil continuous, water continuous or bi-continuous. Preferably the dispersion is oil continuous, more preferably an oil continuous emulsion or oil continuous suspension.

Where a solid phase is present in the dispersion according to the invention, it is preferably a solid phase of dry particulate matter.

Where an aqueous phase is present in the dispersion according to the invention, it is preferably a dispersed aqueous phase.

In the context of the invention the terms "fat", "oil" and triglyceride may be used interchangeably.

Triglycerides are molecules of glycerol esterified to 3 fatty acid residues. Triglycerides are characterised by their fatty acid composition and distribution over the 3 glycerol-ester positions.

The following abbreviations for fatty acids are used herein: U stands for cis-mono- and cis-polyunsaturated fatty acids. H stand for long-chain saturated fatty acids, of 16 carbon atoms (C16) and longer. For example, H2U stands for a triglyceride having two long-chain saturated fatty acids of C16 or longer and one cis-mono- or cis-polyunsaturated fatty acid.

Percentages of triglycerides, e.g. H3 and H2U are expressed and calculated relative to the total weight of the fat phase. All other percentages herein are expressed and calculated relative to the total weight of the edible dispersion.

A monoacid triglyceride is herein defined as a triglyceride that has the same fatty acid on each position of the triglyceride.

The following nomenclature of the polymorphic are used herein:
1. α-polymorph (alpha): a form that gives only one short-spacing line in the X-ray diffraction pattern near 4.15 Å.
2. β'-polymorph (beta'): a form that gives two short spacing lines near 3.80 Å and 4.20 Å in the X-ray diffraction pattern and also shows a doublet in the 720 cm$^{-1}$ in the infrared absorption spectrum
3. β-polymorph (beta): a form that gives three short spacing lines near 3.70, 3.85 and 4.60 in the X-ray diffraction pattern.

See for an explanation of polymorphism and the above definition: Gunstone, F. D.; Harwood, J. L.; Padley, F. B.; The Lipid Handbook, second edition, Chapman and Hall, page 405.

The invention concerns an edible dispersion comprising a fat phase having a Bostwick value of at least 4 at 15° C., wherein the fat phase contains:
a) 1 wt. %<H3<6 wt. %;
b) 1 wt. %<H2U<20 wt. %; characterised in that
c) the H3 triglycerides comprise at least 30 wt. % of monoacid triglycerides.

The amount of H2U should be in accordance with: 1 wt. %<H2U<20 wt. %. Preferably, 0.5 wt %<H2U<10 wt. %, most preferably 1.5 wt %<H2U<8 wt. %

According to a preferred embodiment, 1 wt. %<H3<5 wt. % and 1 wt. %<H2U<15 wt. %, according to a more preferred embodiment, 1.5 wt. %<H3<4 and 1.5 wt %<H2U<10 wt. %.

The present dispersion typically contains H3 and H2U in weight ratio of at least 1:5. Even more preferably the weight ratio H3:H2U is at least 1:5, most preferably it is at least 1:3. The weight ratio H3:H2U usually does not exceed 3:1. Preferably, said ratio does not exceed 2:1. Most preferably, weight ration H3:H2U does not exceed 1:1.

Preferably, the triglycerides in the dispersion are from a triglyceride source which is not partially hydrogenated. Even more preferably, said triglycerides are from a triglyceride source which is not hydrogenated. Partial hydrogenation of unsaturated oils produces is accompanied by the formation of trans-unsaturated fatty acids. The present dispersion, preferably contains less than 6 wt. %, more preferably less than 4 wt. % and most preferably less than 2 wt. % of trans unsaturated fatty acids. Increasingly, consumers prefer fat products that do not contain hydrogenated oils and/or trans-unsaturated fatty acids. The present invention enables the manufacture of pourable edible dispersions that do not contain (partially) hydrogenated oil or substantial levels of trans-unsaturated fatty acids.

Preferably the H3-triglycerides in the edible dispersion consist of monoacid triglycerides for 30 wt. % or more, more preferably for 50 wt. % or more, even more preferably for 70 wt. % or more.

Advantageously, the monoacid triglycerides are 60 wt. % or more, preferably 70 wt. % or more, even more preferably 75 wt. % or more $C_{16}$-monoacid triglyceride. Preferably the edible dispersion comprises fractionated palm oil stearin, more preferably dry-fractionated palm oil stearin and/or double stage dry-fractionated palm oil stearin, more preferably substantially consisting of double stage dry-fractionated palm oil stearin. Typically, the fat phase of the present dispersion comprises at least 1 wt. %, more preferably at least 2 wt. % of fractionated palm stearin. The amount of fractionated palm stearin contained in the fat phase usually does not exceed 10 wt. %. Preferably, said amount does not exceed 8 wt. %.

The edible dispersion may be formed by mixing oil, hardstock and the other phase or phases of the dispersion, such as for example an aqueous phase, a solid phase and/or a gas phase. The mixing of the ingredients may be done in any order, i.e. the ingredients/phases may all be mixed in one mixing step or alternatively the mixing may be executed in more than one step. For instance an oil phase with the structuring agent particles may be mixed and a water phase may be prepared separately and later mixed with the oil phase.

The fat phase of the present dispersion typically contains at least 85 wt. % of liquid oil. More preferably, the fat phase contains at least 90 wt. %, most preferably at least 93 wt. % of liquid oil.

According to one preferred embodiment, the dispersion comprises an aqueous phase and from 40 to 90 wt. % of a fat phase on total product.

The edible dispersion according to the invention have a Bostwick value of at least 4 at 15° C. For pourable products, a Bostwick value of at least 9 is preferred.

The invention further relates to a process for the preparation of a fat-containing edible dispersion, which may be packed in a container, wherein the ingredients of the edible dispersion are heated to melt the fat and then cooled to induce crystallisation of part of the fat phase in the dispersion, characterised in that after initial crystallisation but before filling into the container, the dispersion is kept under shearing conditions for such time and under such shearing conditions, that the ratio: beta/(beta'+alpha+beta)>0.1. Such process is especially suitable for the preparation of the edible dispersions according to the invention.

In a preferred process, the dispersion is kept under shearing conditions for such time and under such shearing conditions, that the ratio: beta/(beta'+alpha+beta)>0.3, preferably that beta/(beta'+alpha+beta)>0.5.

Preferably the edible dispersion according to the invention is a water and oil containing emulsion, optionally including a solid phase. The emulsions are preferably oil continuous. Examples of suitable emulsions are table spreads, sauces, shortenings, cooking oils, and frying oils.

A stable dispersion is herein defined as a dispersion that shows an oil exudation of less than 5% after storage for 15 weeks at 15° C., measured according to the method described in the examples.

A further preferred edible dispersion according to the invention is a dispersion of a solid matter, preferably a dry particulate matter, dispersed in a continuous phase of oil and structuring agent. Preferred material for the dry particulate matter is one or more of flour, starch, salt, herbs (e.g. dried herbs), spices and mixtures thereof. Preferably in such dispersions, the amount of solid matter is 30-75 wt. %, more preferably 40-65 wt. % based on total weight of the dispersion.

The amount of hardstock should be such that a suitably stable dispersion is obtained. The hardstock may be micronised fat as described in co-pending application PCT/EP2004/006544 as structuring agent, the amount in such case is preferably 1-20 wt. %, more preferably 4-12 wt. % based on total weight of the dispersion.

The invention will be further illustrated in the examples.

EXAMPLES

Measuring Oil Separation

A plastic bottle of 500 ml, width: 57 mm, height 160 mm was filled with the sample up to a filling height of 150 mm. After four weeks storage at 15° C. the thickness of the separated oil layer is measured and expressed as vol. % on total sample volume. The vol. % is the rating for emulsion stability.

Measuring Pourability

Pourability or squeezability is measured according to the standard Bostwick protocol. The Bostwick equipment consists of a 125 ml reservoir provided with a outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled with 125 ml of the sample after it has been shaken by hand ten times up and down. When the closure of the reservoir is removed the sample flows from the reservoir and spreads over the tub bottom. The path length of the flow is measured after 15 seconds. The value, expressed as cm per seconds is the Bostwick rating, which is used as yard stick for pourability. The maximum value that can be determined with this measurement is 23.

Example 1

Preparation of an Edible Water-in-Oil Emulsion

A pourable margarine was prepared with the composition shown in table 1:

TABLE 1

Composition of pourable margarine of example 1

| Ingredient | Amount (wt. %) |
| --- | --- |
| Oil phase | |
| Sunflower oil | 77.66 |
| mfPOs | 4.0 |
| Lecithin Bolec MT[1] | 0.18 |
| Fractionated lecithin Cetinol[2] | 0.10 |
| Beta-carotene (1 wt. % solution in sunflower oil) | 0.063 |
| H3 on fat phase | 3.26 |
| H2U on fat phase | 4.6 |
| Fraction of mono-acid triglycerides in H3 fraction | 82 |
| Fraction of mono-acid H3 fraction being C16 mono-acid | ~98 |
| Water phase | |
| Water | 16.5 |
| Sodium chloride | 1.5 |

Explanation of Table 1:

The balance of all composition to 100% is water
1: Lecithin was hydrolysed soybean lecithin (Bolec MT) obtained from UMZ (Golden Hope, Netherlands)
2: Alcohol-soluble fraction from fractionation of native soybean lecithin with alcohol; Cetinol from UMZ, Netherlands.
3: mfPos is double stage dry fractionated palm oil stearin having an IV value of 14 (Loders Croklaan, Netherlands)

The water phase was prepared by adding salt to distilled water which was heated to approximately 80° C. and adjusting the pH of solution from 7.7 to 4.0 using 10 wt. % citric acid in water. The oil phase was prepared by dissolving the emulsifier ingredients and β-carotene in the total amount of sunflower oil at 60° C.

The edible dispersion is processed on a pilot-plant-scale unit comprising scraped surface heat exchangers (A-units) and a crystallizer of 3 L (pin stirrer or C-unit) and a Trefa-unit. The Trefa-unit is an aeration unit (Aeration Machine Type T-50 of Trefa Continu Aerating Systems b.v., Doesburg, Netherlands). The sequence A-A-A-C-Trefa unit. The premix was prepared in a premix tank at 55° C. In exit temperatures from the A, C and Trefa units are given in table 2. The Trefa-unit introduces nitrogen into the emulsion. The throughput of the process was 80 kg/hr.

TABLE 2

Processing details for examples 1 and 2

| Process Unit | | A1-unit | A2-unit | A3-unit | C-unit | Trefa |
| --- | --- | --- | --- | --- | --- | --- |
| Rotation speed | Rpm | 1000 | 1000 | 1000 | 1300 | 350 |
| Exit Temperature | ° C. | 12 | 8 | 5 | 14 | 15 |
| N2 input | L/hr | — | — | — | — | 5.2 |
| Nitrogen content | Vol % | — | — | — | — | 4.5 |

The results in oil separation upon storage at 15° C. for 2 weeks are included in table 4.

Example 2

In the same way as in example 1, a pourable margarine was prepared and analysed. Except de rotations of the C-unit was set on 1000 rpm. The composition of the product of example 2 is shown in table 3:

TABLE 3

Composition of pourable margarine of example 2

| Ingredient | Amount (wt. %) |
| --- | --- |
| Oil phase | |
| Sunflower oil | 75.41 |
| dfPOs | 6.25 |
| Lecithin Bolec MT[1] | 0.18 |
| Fractionated lecithin Cetinol[2] | 0.10 |
| Beta-carotene (1 wt. % solution in sunflower oil) | 0.063 |
| H3 on fat phase | 2.91 |
| H2U on fat phase | 5.4 |
| Fraction of mono-acid triglycerides in H3 fraction | 75 |
| Fraction of mono-acid H3 fraction being C16 mono-acid | ~98 |
| Water phase | |
| Water | 16.5 |
| Sodium chloride | 1.5 |

As in table 1, except that dfPOs is dry fractionated palm oil stearin slip melting point of 53 degrees Celcius (Loders Crocklaan, Netherlands)

The results of examples 1 and 2 are presented in table 4.

TABLE 4

Results of examples 1 and 2

| | Example | |
|---|---|---|
| | 1 | 2 |
| Bostwick (15 s) 2 weeks at 15° C. | 10 | 6 |
| Oil separation at 15° C.: | | |
| Fresh | 0 | 0 |
| 2 weeks | 0 | 0 |
| 4 weeks | 0 | 0 |
| 8 weeks | 0.7 | 0 |
| 12 weeks | 1.4 | 0 |
| 16 weeks | 2.1 | 0 |

The invention claimed is:

1. An edible dispersion comprising a fat phase, the edible dispersion being pourable and having a Bostwick value of at least 4 at 15° C., and showing an oil exudation of less than 5% after storage for 15 weeks at 15° C.;
wherein the fat phase contains at least 90 wt % of liquid oil and:
a) 1 wt. %<H3 triglycerides<6 wt. %;
b) 1 wt. %<H2U triglycerides<20 wt. %; and
c) the H3 triglycerides comprise at least 82 wt. % of monoacid triglycerides;
wherein "H" represents long-chain saturated fatty acids containing at least 16 carbon atoms and "U" represents cis-unsaturated fatty acids;
wherein the triglycerides in the fat phase are from a triglyceride source which is not hydrogenated; and wherein fractionated palm oil stearin represents at least 90 wt.% of all hardstock present in the edible dispersion.

2. The edible dispersion of claim 1, wherein the fat phase contains 1 wt. %<H3 triglycerides<5 wt. % and 1 wt. %<H2U triglycerides<15 wt. %.

3. The edible dispersion of claim 2, wherein the fat phase contains 1.5 wt. %<H3 triglycerides<4 wt. % and 1.5 wt %<H2U triglycerides<10 wt. %.

4. The edible dispersion of claim 1, wherein the monoacid triglycerides contain at least 60 wt. % of $C_{16}$-monoacid triglyceride.

5. The edible dispersion of claim 1, wherein the weight ratio of H3 triglycerides to H2U triglycerides exceeds 1:3.

6. The edible dispersion of claim 1, further comprising fractionated palm oil stearin.

7. The edible dispersion of claim 6, wherein the fat phase comprises 1-10 wt. % of fractionated palm oil stearin.

8. The edible dispersion of claim 6, wherein the fractionated palm oil stearin is dry-fractionated palm oil stearin.

9. The edible dispersion of claim 8, wherein the fractionated palm oil stearin is double stage dry-fractionated palm oil stearin.

10. The edible dispersion of claim 1, further comprising an aqueous phase and wherein the fat phase comprises from 40 to 90 wt. % of the edible dispersion.

11. The edible dispersion of claim 7, wherein the fat phase comprises 2-8 wt % of fractionated palm oil stearin.

12. An edible dispersion, comprising a fat phase, the edible dispersion being pourable and having a Bostwick value of at least 9 at 15° C.;
wherein the fat phase comprises at least 90 wt % of liquid oil and:
a) 1 wt. %<H3 triglycerides<6 wt. %;
b) 1 wt.%<H2U triglycerides<20 wt. %; and
c) the H3 triglycerides comprise at least 82 wt. % of monoacid triglycerides;
wherein "H" represents long-chain saturated fatty acids containing at least 16 carbon atoms and "U" represents cis-unsaturated fatty acids; and wherein fractionated palm oil stearin represents at least 90% of all hardstock present in the edible dispersion.

13. An edible dispersion comprising a fat phase, the edible dispersion being pourable and having a Bostwick value of at least 4 at 15° C.;
wherein the fat phase comprises at least 90 wt % of liquid oil and:
a) 1 wt. %<H3 triglycerides<6 wt. %;
b) 1 wt. %<H2U triglycerides<20 wt. %; and
c) the H3 triglycerides comprise at least 82 wt. % of monoacid triglycerides;
wherein "H" represents long-chain saturated fatty acids containing at least 16 carbon atoms and "U" represents cis-unsaturated fatty acids;
wherein the triglycerides in the fat phase are from a triglyceride source which is not hydrogenated; and wherein fractionated palm oil stearin represents at least 90 wt. % of all hardstock present in the edible dispersion.

14. The edible dispersion of claim 1, wherein the monoacid triglycerides contain at least 98 wt. % of $C_{16}$-monoacid triglyceride.

15. The edible dispersion of claim 1, wherein the edible dispersion has a ratio of β-polymorph/(β'-polymorph+α-polymorph+β-polymorph)>0.5.

* * * * *